United States Patent
Liang et al.

(10) Patent No.: US 8,194,553 B2
(45) Date of Patent: Jun. 5, 2012

(54) NETWORK SYSTEM, TRAFFIC BALANCING METHOD, NETWORK MONITORING DEVICE AND HOST

(75) Inventors: Zhi Yong Liang, Beijing (CN); Yi Ge, Beijing (CN); Yung Hua Lin, Beijing (CN); Yan Qi Wang, Beijing (CN); Guo Hui Lin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 11/391,160

(22) Filed: Mar. 28, 2006

(65) Prior Publication Data

US 2008/0273461 A1 Nov. 6, 2008

(30) Foreign Application Priority Data

Mar. 29, 2005 (CN) .......................... 2005 1 00625719

(51) Int. Cl.
*H04L 12/26* (2006.01)
(52) U.S. Cl. ........................................ 370/237; 370/466
(58) Field of Classification Search .................. 370/229, 370/230, 230.1, 232–235, 237, 389, 392, 370/393, 395.2, 395.21, 395.31, 395.41, 370/395.5, 395.52, 431, 437, 464–466
See application file for complete search history.

(56) References Cited

U.S. PATENT DOCUMENTS

| | | | | |
|---|---|---|---|---|
| 6,038,233 A * | 3/2000 | Hamamoto et al. | ........... | 370/401 |
| 6,650,621 B1 * | 11/2003 | Maki-Kullas | ................. | 370/238 |
| 6,671,259 B1 * | 12/2003 | He et al. | ........................ | 370/238 |
| 6,744,767 B1 * | 6/2004 | Chiu et al. | ................ | 370/395.21 |
| 6,822,940 B1 * | 11/2004 | Zavalkovsky et al. | ......... | 370/237 |
| 6,845,091 B2 * | 1/2005 | Ogier et al. | .................... | 370/338 |
| 7,069,312 B2 * | 6/2006 | Kostic et al. | ................... | 709/220 |
| 7,116,681 B1 * | 10/2006 | Hovell et al. | ................. | 370/466 |
| 7,228,131 B2 * | 6/2007 | Yokota et al. | ............... | 455/426.1 |
| 7,231,452 B2 * | 6/2007 | Ananda et al. | ................ | 709/230 |
| 7,319,696 B2 * | 1/2008 | Inoue et al. | ..................... | 370/392 |
| 7,796,620 B2 * | 9/2010 | Elwell | ........................... | 370/401 |
| 2001/0040895 A1 * | 11/2001 | Templin | ......................... | 370/466 |
| 2002/0087696 A1 * | 7/2002 | Byrnes | ........................... | 709/226 |
| 2003/0009559 A1 | 1/2003 | Ikeda | | |
| 2003/0048750 A1 * | 3/2003 | Kobayashi | ..................... | 370/229 |
| 2003/0149790 A1 | 8/2003 | Hwang | | |
| 2003/0161313 A1 * | 8/2003 | Jinmei et al. | ................... | 370/392 |
| 2003/0174717 A1 | 9/2003 | Zabarski et al. | | |

(Continued)

FOREIGN PATENT DOCUMENTS

CN 1376351 A 10/2002

(Continued)

OTHER PUBLICATIONS

R. Draves, "Default Address Selection for Internet Protocol Version 6 (IPv6)," IETF RFC 3484, Feb. 2003, 27 pages.

*Primary Examiner* — Chi Pham
*Assistant Examiner* — Curtis A Alia
(74) *Attorney, Agent, or Firm* — Daniel E. Johnson; Ryan, Mason & Lewis, LLP

(57) ABSTRACT

A traffic balancing system, traffic balancing device and traffic balancing method that converts IP packets by switching IP address of the destination host between the dual stack hosts communicating with each other, in order to control traffic balancing in the networks.

31 Claims, 11 Drawing Sheets

U.S. PATENT DOCUMENTS

| | | |
|---|---|---|
| 2003/0185236 A1 | 10/2003 | Asano et al. |
| 2003/0219023 A1* | 11/2003 | Miyata et al. ............ 370/395.53 |
| 2004/0013130 A1* | 1/2004 | Blanchet et al. ............. 370/466 |
| 2004/0111529 A1 | 6/2004 | Parmar |
| 2004/0120266 A1* | 6/2004 | Ko et al. ....................... 370/252 |
| 2004/0131079 A1* | 7/2004 | Hegde et al. ................. 370/466 |
| 2004/0133692 A1 | 7/2004 | Blanchet et al. |
| 2004/0162909 A1 | 8/2004 | Choe et al. |
| 2004/0179536 A1 | 9/2004 | Thubert et al. |
| 2004/0233916 A1 | 11/2004 | Takeuchi et al. |
| 2004/0240468 A1 | 12/2004 | Chin et al. |
| 2004/0264377 A1* | 12/2004 | Kilkki et al. .................. 370/235 |
| 2005/0002389 A1* | 1/2005 | Venkatanarayan et al. ... 370/389 |
| 2005/0111494 A1* | 5/2005 | Kecskemeti ................... 370/521 |
| 2005/0276279 A1* | 12/2005 | Louis Peschi ............... 370/466 |

FOREIGN PATENT DOCUMENTS

| | | |
|---|---|---|
| CN | 1525713 A | 9/2004 |

* cited by examiner

PRIOR ART

Fig. 8

| IPv4 address for destination host | IPv6 address for destination host | Address priority |
|---|---|---|
| IPv4 address for host B | IPv6 address for host B | IPv4 |
| ... | ... | ... |
| IPv4 address for host X | IPv6 address for host X | IPv6 |

NETWORK SYSTEM, TRAFFIC BALANCING METHOD, NETWORK MONITORING DEVICE AND HOST

TECHNICAL FIELD OF THE INVENTION

The present invention relates to a network traffic balancing system, traffic balancing device and traffic balancing method, and more particularly, to a network system, traffic balancing method, network monitoring device and host for balancing network traffic among various different networks employing IP protocols.

BACKGROUND OF THE INVENTION

With the increasing expansion of the Internet, existing IPv4 addresses composed of 32 bits are becoming insufficient. Accordingly, an IPv6 protocol employing an IP address of 128 bits appears to thoroughly solve the problem of insufficiency of the IPv4 addresses and to make significant improvements on address capacity, security, network management, mobility, quality of service, etc. Before the IPv6 protocol becomes the mainstream protocol, the IPv4 protocol will continue being used, thus the coexistence of the IPv4 network and the IPv6 network occurs. In addition, due to the imbalance of address allocation, some countries or regions still have enough IPv4 address space for allocation, and the IPv4 network will exist in these countries or regions for a long time. In the foreseeable future, the IPv4 network and the IPv6 network will coexist for quite some time.

The Internet Engineering Task Force (IETF) has established a specialized NGTRANS (Next Generation Transition) working group to study the problem of IPv4/IPv6 transition and efficient seamless intercommunication. Various transition technologies and intercommunication approaches have been developed at present. One of the typical transition technologies is dual protocol stack. The dual protocol stack technology is the most direct way to make IPv6 nodes compatible with IPv4 nodes, and the objects to be applied comprise communication nodes such as hosts and routers.

FIG. 1A shows a system intercommunicating by means of the dual protocol stack. An IPv4 protocol stack or an IPv6 protocol stack may be used for communication when an IPv4/IPv6 node 1 and an IPv4/IPv6 node 2 both supporting the dual protocol stack are intercommunicating. In the dual stack protocol technology shown in FIG. 1A, the nodes 1 and 2 supporting the dual stack protocol are allocated an IPv4 address and an IPv6 address by, for example, a dual protocol stack address server. In relation to the addresses used by the communication between dual stack nodes, IETF has suggested a default selection method for the nodes. In the method, a selected address (IPv4 or IPv6 address) is always used in the communication between two dual stack nodes, without the selected address being dynamically changed. The document RFC 3484 in the website www.ietf.org discusses the default address selection method in detail.

In the prior art, in order to solve the intercommunication problem between the IPv4 network and the IPv6 network, tunneling technology is also employed as the technology for transition from the IPv4 network to the IPv6 network. FIG. 1B is a schematic diagram showing the prior art in which the network intercommunication is made by means of the tunneling technology. In the tunneling technology, assuming an IPv6 node C accesses an IPv6 node D, after a IPv6 packet sent to the node D by the IPv6 node C arrives at a router X, a 6 over 4 IP packet is formed by the router X by encapsulating the IPv6 packet sent to the node D into an IPv4 packet whose destination address in the header is the IPv4 address of a router Y. The 6 over 4 packet is transmitted via the IPv4 network to the router Y, which removes the header of the IPv4 packet and transmits the IPv6 packet to the IPv6 node D via the IPv6 network. Therefore, the IPv6 packet can be transmitted over the IPv4 network by forming a tunneling path for transmitting the IPv6 packet between the routers X and Y. On the other hand, the IPv4 packet can be transmitted in a tunneling path of the IPv6 network by forming a 4 over 6 IP packet by encapsulating the IPv4 packet into the IPv6 packet.

However, in the above methods, bandwidth and router resource will be contended by IPv4 traffic and IPv6 traffic. In addition, a case where the IPv4 network is particularly busy while the IPv6 network resource is wasted might occur, and vice versa. In addition, in the prior art mentioned above, the network with lighter traffic cannot be selectively used for information transmission based on real-time traffic in the current network to utilize the network resource efficiently, since a fixed IPv4 address or IPv6 address is used when transmitting and receiving information between nodes communicating with each other, thereby using the corresponding IPv4 network or IPv6 network for information transmission. In particular, when the traffic in the IPv4 network is very heavy while the traffic in the IPv6 network is very light, or vice versa, the prior art cannot make real-time adjustments on the traffic in the two networks to improve the problem of utilization imbalance between the two networks.

SUMMARY OF THE INVENTION

To solve the above problems in the prior art, an object of the present invention is to provide a system for dynamically balancing network traffic in various networks employing IP protocols.

Another object of the present invention is to provide a method for dynamically balancing network traffic in various networks employing IP protocols.

Another object of the present invention is to provide a dual stack host capable of switching the IP protocol addresses of the transmitted IP packets to adapt to the communication status of the current network in real-time.

Another object of the present invention is to provide a method capable of switching the IP protocol addresses of the transmitted IP packets to adapt to the communication status of the current network in real-time.

A further object of the present invention is to provide a network monitoring device capable of monitoring the traffic in the respective networks.

A further object of the present invention is to provide a method capable of monitoring the traffic in the respective networks.

In order to achieve the objects described above, the present invention provides a network system for traffic balancing among different networks employing a plurality of IP protocols, that is, two or more than two IP protocols, comprising a plurality of hosts supporting the two or more than two IP protocols, and a network monitoring device for monitoring traffic in each of the networks, wherein the network monitoring device comprises: monitoring means for monitoring the traffic in said each of the networks; judging means for judging whether the traffic in a first network employing a first IP protocol is balanced compared with the other networks, based on the network traffic monitored by the monitoring means; notifying means for, when the judging means judges that traffic imbalance occurs in the first network, notifying a host transmitting and receiving IP packets by employing the first IP protocol to transmit the packets by using a second IP protocol, wherein said host comprises: re-encapsulating means for converting the next IP packet to be transmitted employing the first IP protocol into the IP packet employing the second IP protocol, in response to the notification of the notifying means; and transmitting means for transmitting the IP packet employing the second IP protocol.

The present invention provides a method for traffic balancing among different networks employing a plurality of IP Protocols, that is, two or more than two IP protocols, the method being used in a network system comprising a plurality of hosts supporting the two or more than two IP protocols and a network monitoring device for monitoring traffic in each of the networks, characterized by comprising the steps of: monitoring the traffic in each of the networks; judging whether the traffic in a first network employing a first IP protocol is balanced compared with the other networks, based on the monitored network traffic; when it is judged that traffic imbalance occurs in the first network, notifying a host transmitting and receiving IP packets by employing the first IP protocol to re-encapsulate the packets to be transmitted by using a second IP protocol, the host converting the next IP packet to be transmitted employing the first IP protocol into the IP packet employing the second IP protocol and then transmitting the same.

The present invention provides an IPv4/IPv6 traffic balancing method for balancing information traffic in an IPv4 network and an IPv6 network, characterized by comprising the steps of: judging whether imbalance of IPv4 packets and IPv6 packets transmitted over the networks occurs; and converting the IPv4 packet to be subsequently transmitted into the IPv6 packet, or the IPv6 packet to be subsequently transmitted into the IPv4 packet, based on the network environment when it is judged that imbalance occurs.

The present invention provides a host used in a network system for traffic balancing among different networks employing two IP more than two IP protocols, the host supporting the two or more than two IP protocols, and a network monitoring device in the network system monitoring traffic in each of the networks, characterized in that the host comprises: transmitting means for transmitting IP packets; and re-encapsulating means for, when the network monitoring device judges that traffic imbalance occurs in a network employing a first IP protocol, encapsulating the next IP packet to be transmitted employing the first IP protocol into the IP packet employing a second IP protocol, wherein the transmitting means transmitting the IP packet employing the second IP protocol.

The present invention provides a method performed by a host used in a network system for traffic balancing among different networks employing two or more than two IP protocols, the host supporting the two or more than two IP protocols, and a network monitoring device in the network system monitoring traffic in each of the networks, characterized in that the host performs the steps of: transmitting IP packets employing a first IP protocol; encapsulating the next IP packet to be transmitted employing the first IP protocol into the IP packet employing a second IP protocol, when the network monitoring device judges that traffic imbalance occurs in the network employing the first IP protocol; and transmitting the IP packet employing the second IP protocol.

The present invention provides a network monitoring device used in a network system for traffic balancing among different networks employing two or more than two IP protocols, the network system comprising a plurality of hosts supporting the two or more than two IP protocols, characterized in that the network monitoring device comprises: monitoring means for monitoring the traffic in each of the networks; judging means for judging whether the traffic in a first network employing a first IP protocol is balanced compared with the other networks, based on the network traffic monitored by the monitoring means; notifying means for, when the judging means judges that traffic imbalance occurs in the first network, notifying a host transmitting and receiving IP packets by employing the first IP protocol to re-encapsulate the packets to be transmitted by using a second IP protocol.

The present invention provides a method performed by a network monitoring device used in a network system for traffic balancing among different networks employing two or more than two IP protocols, the network system comprising a plurality of hosts supporting the two or more than two IP protocols, characterized by comprising the steps of: monitoring traffic in each of the networks; judging whether the traffic in a first network employing a first IP protocol is balanced compared with the other networks; when it is judged that traffic imbalance occurs in the first network, notifying a host transmitting and receiving IP packets by employing the first IP protocol to re-encapsulate the packets to be transmitted by using a second IP protocol.

An advantage of the present invention is that traffic balance in the networks can be controlled by switching IP address of the destination hosts between the dual stack hosts communicating with each other and converting the IP packets.

Another advantage of the present invention is that balance of IPv4/IPv6 traffic in the networks can be controlled without bringing extra burden to users in upper layers, since the present invention modifies only the IP layer in the protocol stack without affecting the upper application.

BRIEF DESCRIPTION OF THE DRAWINGS

These and other objects and advantages of the present invention will become more apparent from the following detailed description of the preferred embodiments of the present invention taken in conjunction with the appended drawings.

FIG. 8 is a table showing an address priority table.

DETAILED DESCRIPTION OF THE INVENTION

For the sake of illustration, taking networks, hosts and routers under the IPv4 protocol and the IPv6 protocol as examples, the present invention is now described. However, the present invention is not limited to the IPv4 protocol and the IPv6 protocol, and can be applied to any network employing IP protocols.

Moreover, it is assumed the host used as a communication source and the host used as a communication destination in the present invention support both the IPv4 protocol and the IPv6 protocol; and the router on the side of the host as the communication source and the router on the side of the host as the communication destination also support both the IPv4 protocol and the IPv6 protocol.

The principle of the present invention is now described with reference to FIG. 2.

Figure 1A:
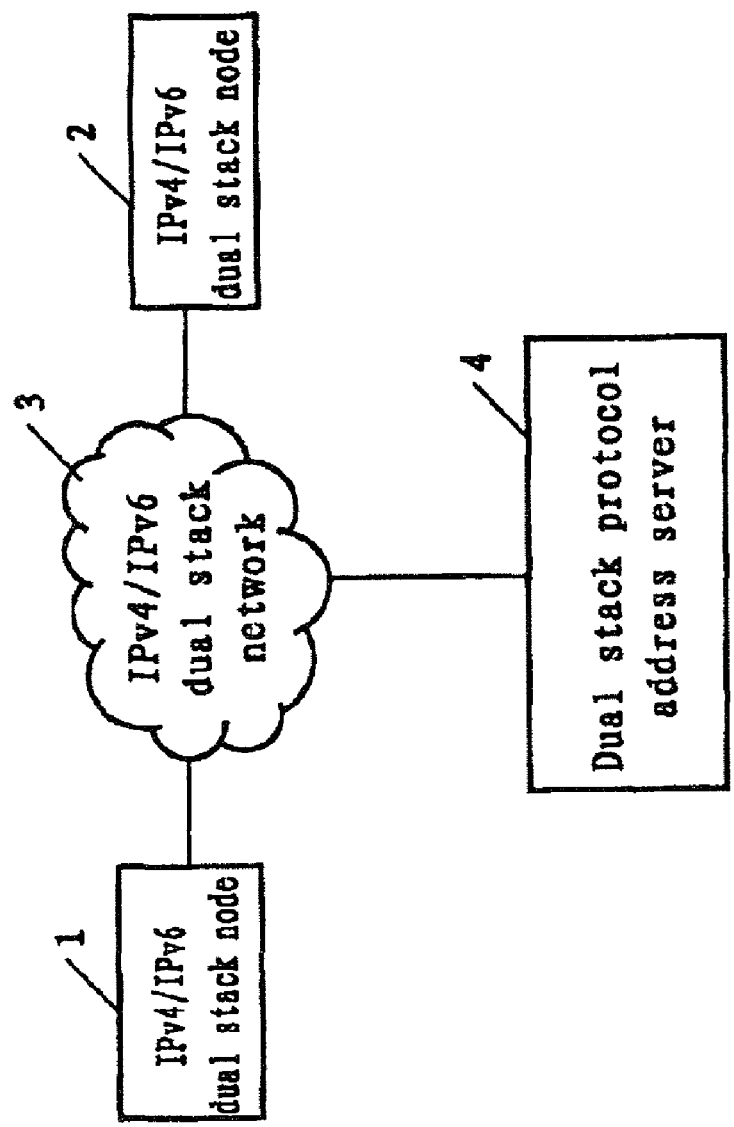
FIG. 1A is a schematic diagram showing the dual stack protocol technology in the prior art.
Figure 1B:
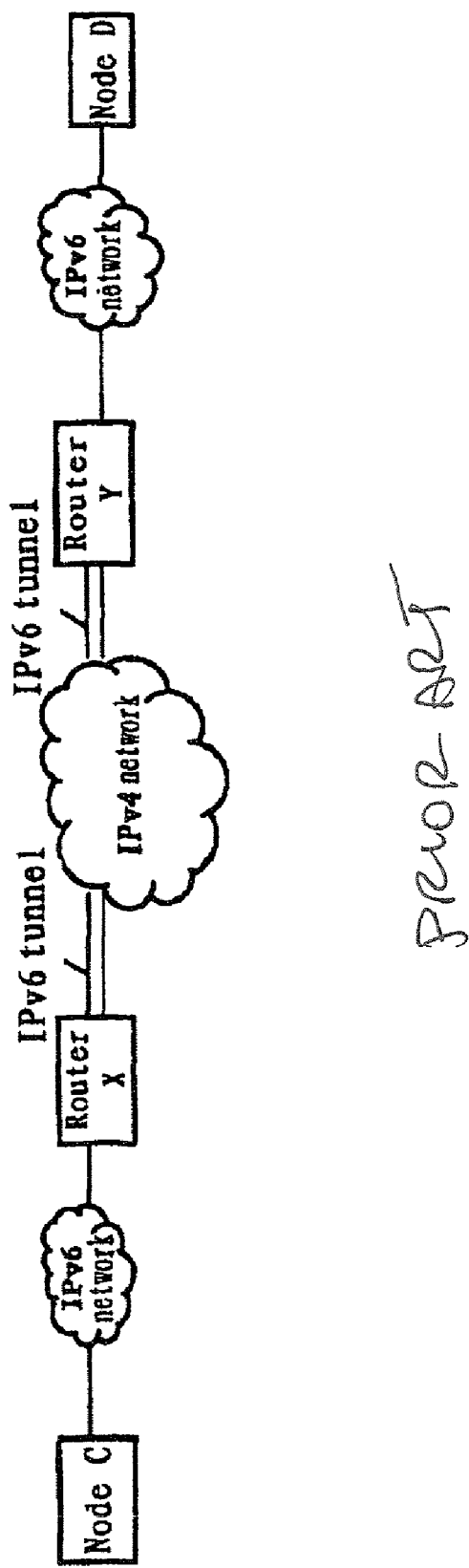
FIG. 1B is a schematic diagram showing the tunneling technology in the prior art.
Figure 2:
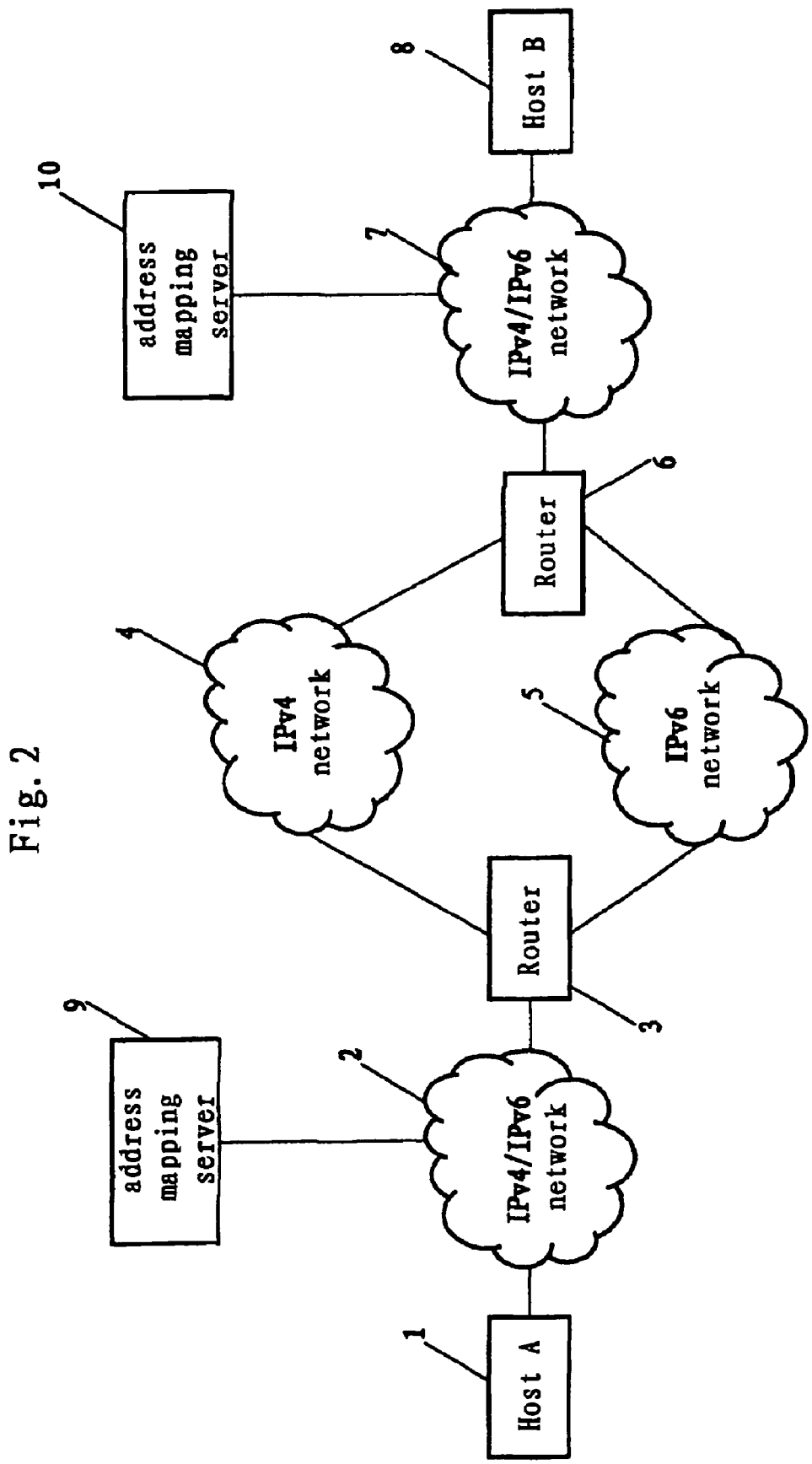
FIG. 2 is an outlined view showing the principle of the present invention.

In FIG. 2, a host A1 and a host B8 (hereinafter referred to as the dual stack hosts) support both the IPv4 protocol and the IPv6 protocol. The hosts A1 and B8 have an IPv4 address and an IPv6 address, respectively. An address mapping server 9 and an address mapping server 10 each contain an IPv4/IPv6 address mapping table for holding the correspondence relationship between the IPv4 addresses and the IPv6 addresses of all the dual stack hosts, respectively. The function of the above address mapping servers mentioned may be achieved by a DNS server. The host A1 obtains the IPv4/IPv6 address of the host B8 by transmitting to the address mapping server 9 a lookup request for looking up the address of the host B8 as the communication destination. Moreover, the host B8 obtains the IPv4/IPv6 address of the host A1 by transmitting to the address mapping server 10 a lookup request for looking up the address of the host A1 as the communication destination.

An IPv4/IPv6 network 2 and an IPv4/IPv6 network 7 are dual stack networks supporting both the IPv4 protocol and the IPv6 protocol.

A router 3 is a router between the IPv4/IPv6 network 2 and an external network such as an IPv4 network 4 and an IPv6 network 5. The router 3 forwards the IPv4 packets or the IPv6 packets transmitted from the nodes in the IPv4/IPv6 network 2 to other nodes, or forwards the packets coming from external nodes to corresponding nodes in the IPv4/IPv6 network 2.

Router 6 is a router between the IPv4/IPv6 network 7 and an external network such as the IPv4 network 4 and the IPv6 network 5. The router 6 forwards the IPv4 packets or the IPv6 packets transmitted from the nodes in the IPv4/IPv6 network 7 to other nodes, or forwards the packets coming from external nodes to corresponding nodes in the IPv4/IPv6 network 7.

The IPv4 network 4 only supports the IPv4 protocol, while the IPv6 network 5 only supports the IPv6 protocol.

According to the present invention, the router 3 is assumed to monitor the network traffic in the IPv4 network 4 and the IPv6 network 5, respectively, when the host A1 is transmitting the IPv4 packets to the host B8. When the network traffic in the IPv4 network 4 and the IPv6 network 5 is judged as imbalanced, for example, when the load in the IPv4 network 4 is heavier, the router 3 will notify the host A1 that the packets to be subsequently transmitted to the communication destination such as the host B8 need to use the IPv6 packets.

In response to this notification, the host A1 converts the IPv4 packets to be packaged for transmission into the IPv6 packets and then transmits the IPv6 packets.

In this way, the packets needed to be transmitted over the IPv4 network 4 originally are now transmitted over the IPv6 network 5 with lighter load, such that the load imbalance between the IPv4 network 4 and the IPv6 network 5 is reduced.

The packets transmitted from the host B8 to the host A1 may be similarly processed by means of the method mentioned above, such that the load imbalance between the IPv4 network 4 and the IPv6 network 5 can be reduced by the conversion between the IPv4 packets and IPv6 packets on the host B8 side.

In addition, the example given above relates to the conversion from the IPv4 packets to the IPv6 packets. If the load in the IPv4 network 4 is lighter while the load in the IPv6 network 5 is heavier, and if the packets transmitted between the host A1 and the host B8 are the IPv6 packets, the conversion from the IPv6 packets to the IPv4 packets may be achieved by encapsulating the IPv6 packets into the IPv4 packets.

According to the present invention, each of the dual stack hosts maintains an IPv4/IPv6 address priority table for recording whether the packets transmitted from the dual stack host as the communication source to another dual stack host as the communication destination are preferably the IPv4 packets or the IPv6 packets, i.e., the priority of the IP protocol used by the IP packets to be transmitted is stored.

For example, when the router 3 notifies the host A1 that the packets to be subsequently transmitted to the communication destination such as the host B8 need use the IPv6 packet format, the host A1 modifies the maintained IPv4/IPv6 address priority table such that the IPv6 packet priority regarding the communication destination is higher than the IPv4 packet priority. The host A1 always packages or re-encapsulates packets into the packets which has the highest priority.

Figure 3:
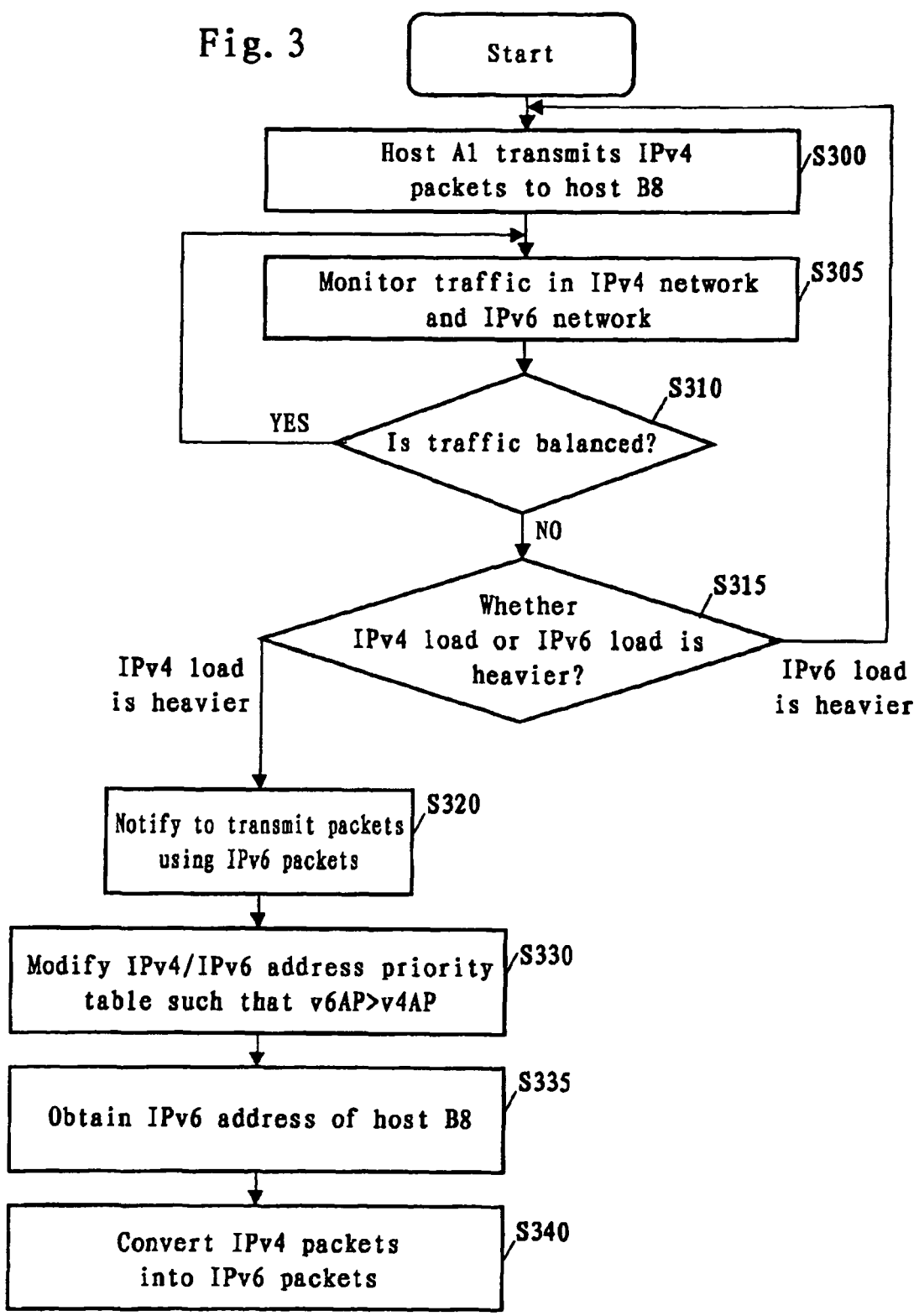
FIG. 3 is a flowchart showing a process of a network system according to the present invention.

FIG. 3 shows a process according to the present invention.

In step S300, the host A1 transmits the IPv4 packets to the host B8. In step S305, the router 3 monitors the network traffic in the IPv4 network 4 and the IPv6 network 5, respectively. In step S310, the router 3 judges whether the network traffic between the IPv4 network 4 and the IPv6 network 5 is balanced. When the network traffic between the IPv4 network 4 and the IPv6 network 5 is judged as imbalanced, the process proceeds to step S315. When the network traffic between the IPv4 network 4 and the IPv6 network 5 is judged as balanced, the process returns to step S305 and continues. In step S315, it is judged whether the load in the IPv4 network 4 or that in the IPv6 network 5 is heavier. When the load in the IPv4 network 4 is heavier, in step S320, the router 3 notifies the host A1 that the packets to be subsequently transmitted to the host B8 need use the IPv6 packet format. When the load in the IPv6 network 5 is heavier, the conversion of the packets is unnecessary, and the host A1 still transmits the IPv4 packets to the host-B8.

In step S330, in response to the notification, the host A1 modifies the IPv4/IPv6 address priority table such that the IPv6 packet has higher priority. Then, in step S335, the host A1 obtains the IPv6 address of the host B8 from the address mapping server 9. In step S340, the host A1 converts the IPv4 packets to be transmitted into the IPv6 packets and then transmits the IPv6 packets.

Figure 4:
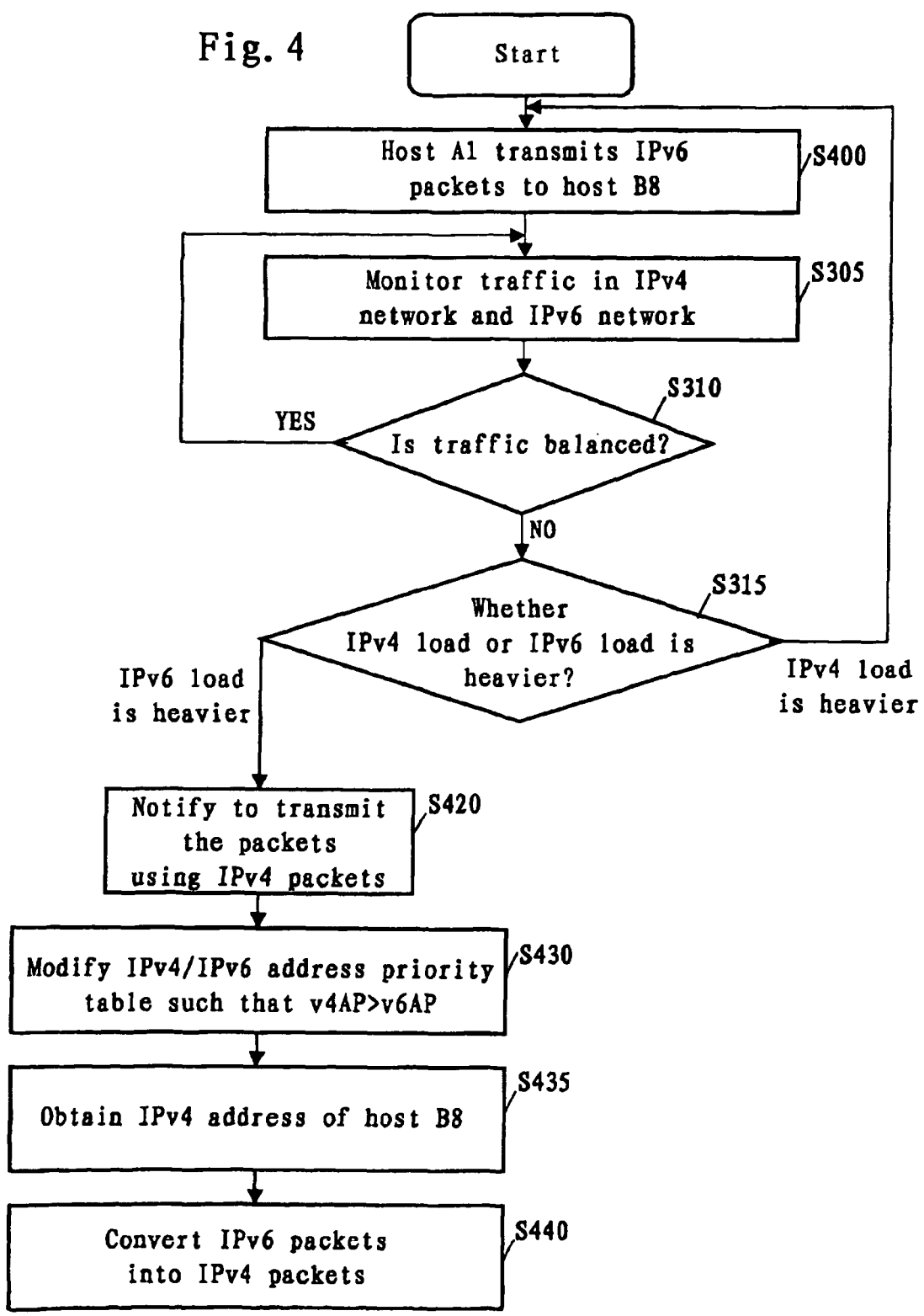
FIG. 4 is a flowchart showing a process of a network system according to the present invention.

FIG. 4 shows a case where the host A1 transmits the IPv6 packets to the host B8. The flowchart shown in FIG. 4 differs from that of FIG. 3 in the process after step S400 and step S315. Like reference numerals are used for those components similar with those in FIG. 3, and thus the description thereof is omitted.

Firstly, in step S400, the host A1 transmits the IPv6 packets to the host B8. If the load in the IPv6 network 5 is judged as heavier in step S315, in step S420, the router 3 notifies the host A1 that the packets to be subsequently transmitted to the host B8 need use the IPv4 packet format. If the load in the IPv4 network 4 is heavier, the conversion of the packets is unnecessary, and the host A1 still transmits the IPv6 packets to the host B8.

In step S430, in response to the notification, the host A1 modifies the IPv4/IPv6 address priority table such that the IPv4 packet is prioritized. Then, in step S435, the host A1 obtains the IPv4 address of the host B8 from the address mapping server 9. In step S440, the host A1 encapsulates the IPv6 packets to be transmitted into the IPv4 packets whose destination address is the IPv4 address of the host B8 and then transmits the IPv4 packets.

The operations of the router 3 will be described below with reference to FIGS. 5 and 6.

The router 3 monitors the network communication status of the IPv4 network 4 and the IPv6 network 5. When it is judged that the network load in the IPv4 network 4 and the IPv6 network 5 need to be adjusted, the corresponding communication sources are notified that the subsequent communication needs to use the packet format of another type.

Figure 5:
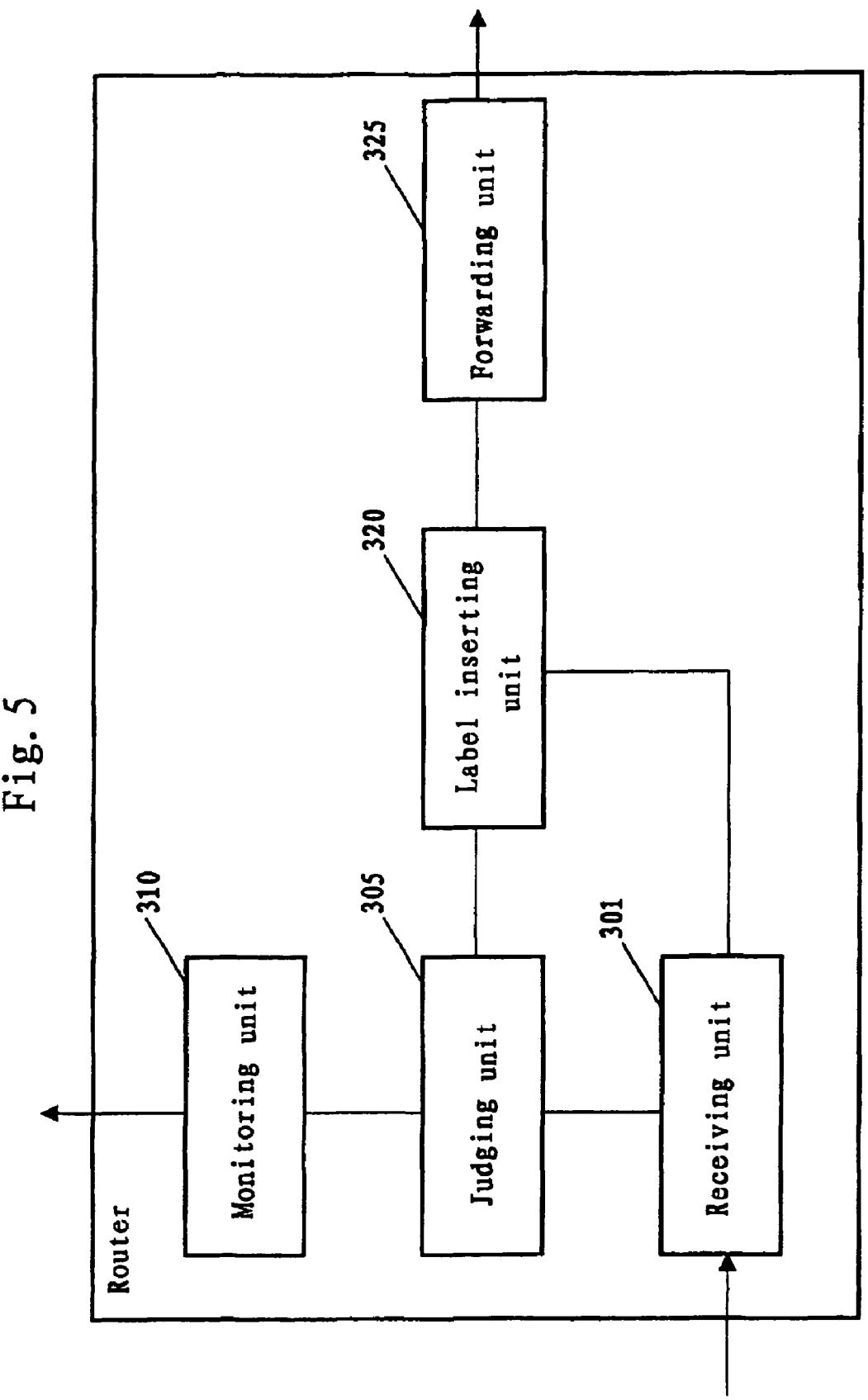
FIG. 5 is a diagram showing the structure of a router.
Figure 6:
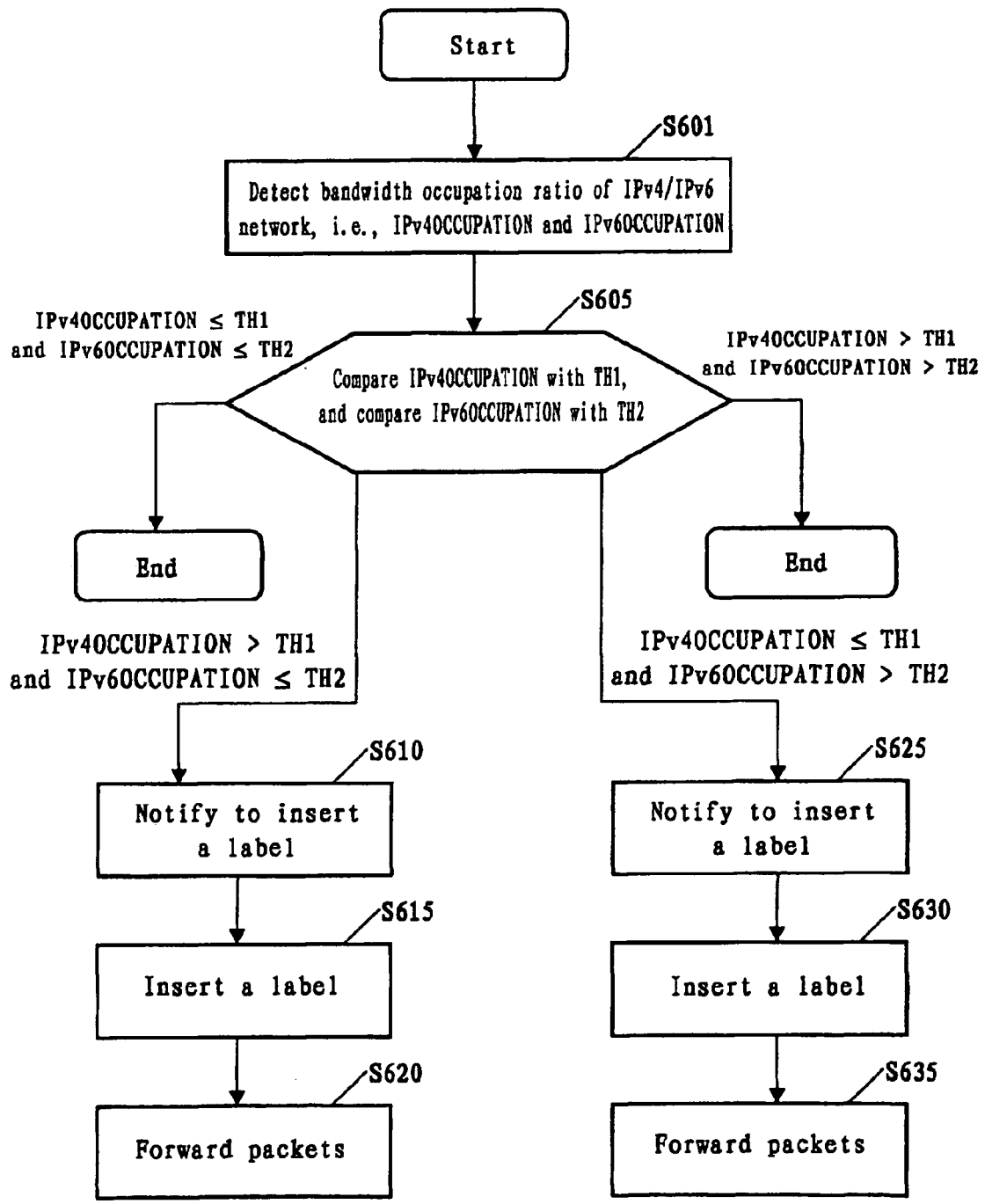
FIG. 6 is a flowchart showing a process of the router.

In the embodiments given in FIGS. 5 and 6, the communication source and the communication destination are notified by adding a label representing the need of switching IP packet addresses into the IP packets to be forwarded. However, those skilled in the art would also use any other existing means to notify the communication source and the communication destination of the switching of IP packet addresses.

FIG. 5 is a diagram showing the structure of the router.

The router 3 comprises a receiving unit 301, a judging unit 305, a monitoring unit 310, a label inserting unit 320 (a notifying unit) and a forwarding unit 325.

FIG. 6 is a flowchart showing a process of the router 3.

In step S601, the monitoring unit 301 detects a bandwidth occupation ratio of the IPv4 network 4, i.e., IPv4OCCUPATION, and a bandwidth occupation ratio of the IPv6 network 5, i.e., IPv6OCCUPATION.

In step S605, the judging unit 305 compares the bandwidth occupation ratio IPv4OCCUPATION of the IPv4 network 4 with a predefined threshold TH1, and compares the bandwidth occupation ratio IPv6OCCUPATION of the IPv6 network 5 with a predefined threshold TH2.

If the comparison result is IPv4OCCUPATION≦threshold TH1, and IPv6OCCUPATION≦threshold TH2, the process ends.

If the comparison result is IPv4OCCUPATION>threshold TH1, and IPv6OCCUPATION>threshold TH2, the process ends.

If the comparison result is IPv4OCCUPATION>threshold TH1, and IPv6OCCUPATION≦threshold TH2, the process proceeds to step S610.

If the comparison result is IPv4OCCUPATION≦threshold TH1, and IPv6OCCUPATION>threshold TH2, the process proceeds to step S625.

In step S610, the judging unit 305 notifies the label inserting unit 320 to insert into the IPv4 packets to be forwarded an IP address switch prompting label for prompting that the IPv6 address is more preferable at present. In step S615, for the IPv4 packets received in the receiving unit 301, the label inserting unit 320 inserts an IP address switch prompting label at a predetermined position of the IPv4 packets. Then, in step S620, the forwarding unit 325 forwards the IPv4 packets with the IP address switch prompting label inserted to the communication destination.

In step S625, the judging unit 305 notifies the label inserting unit 320 to insert into the IPv6 packets to be forwarded an IP address switch prompting label for prompting that the IPv4 address is more preferable at present. In step S630, for the IPv6 packets received in the receiving unit 301, the label inserting unit 320 inserts an IP address switch prompting label at a predetermined position of the IPv6 packets. Then, in step S635, the forwarding unit 325 forwards the IPv6 packets with the IP address switch prompting label inserted to the communication destination.

The router 3 may further comprise a selecting unit (not shown) for selecting from the IP packets to be forwarded some packets only into which the label inserting unit 320 inserts IP packet labels. To enhance the efficiency of the router 3, the selecting unit may discard the packets to be dropped and only choose the packets capable of being forwarded, only into which the label inserting unit 320 inserts IP packet labels. Accordingly, the router 3 can insert an IP address switch prompting label into the packets to be forwarded to prompt the switching of the IP packet addresses, based on the traffic in different kinds of current networks.

Figure 7:
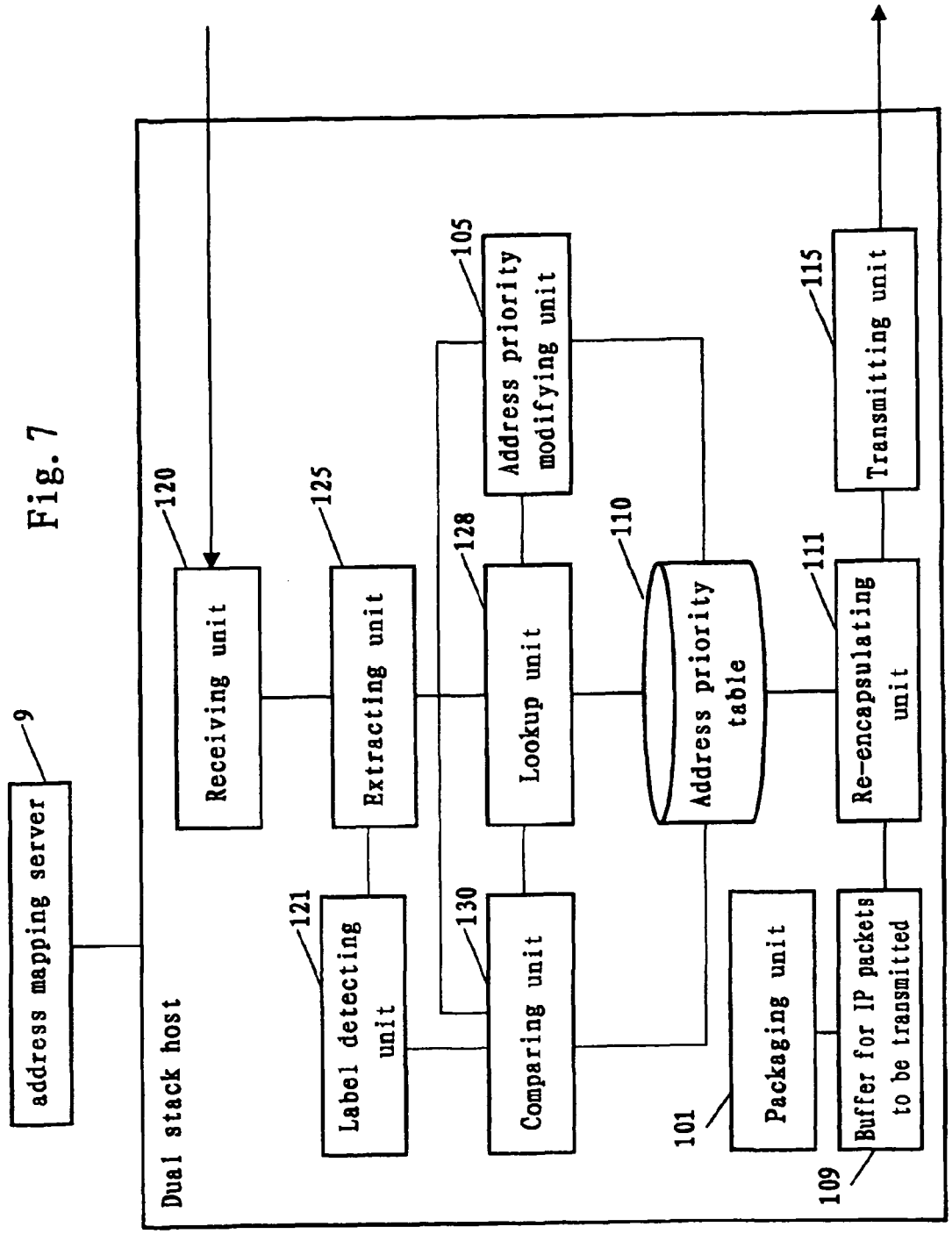
FIG. 7 is a diagram showing the structure of a dual stack host.

FIG. 7 is a diagram showing the structure of the dual stack host in the network system as shown in FIG. 2. The dual stack host shown in FIG. 7 can serve as both the communication source and the communication destination. However, regardless of a dual stack host serving either as the communication source or as the communication destination, the received packets are similarly processed by the dual stack host according to the present invention. In addition, the structure shown in FIG. 7 is only illustrative; those skilled in the art may make any combination or addition on the premise that the objects of the present invention can be achieved.

As shown in FIG. 7, the dual stack host comprises a packaging unit 101, an address priority modifying unit 105, a buffer 109 for the IP packets to be transmitted, an address priority table 110, a re-encapsulating unit 111, a transmitting unit 115, a receiving unit 120, a label detecting unit 121, an extracting unit 125, a lookup unit 128, and a comparing unit 130.

The packaging unit 101 packages the information to be transmitted, puts the IP packets to be transmitted into the buffer 109 for the IP packets to be transmitted, and waits for the transmission of the transmitting unit 115. The transmitting unit 115 transmits the packets packaged by the packaging unit 101.

The address priority table 110 stores priorities of the IP addresses that should be used by the packets transmitted from the current host to the corresponding destination hosts, together with the IPv4 addresses and the IPv6 addresses of the destination hosts. The fields of the address priority table 110 are defined as shown in FIG. 8, which comprise an IPv4 address for the destination host 801, an IPv6 address for the destination host 805 and an address priority 810. The address priority 810 stores version information of the IP protocol with higher priority. For example, if the IPv4 address priority of the packets transmitted to the destination host is higher than the IPv6 address priority, the IP protocol version information representing that the information to be transmitted to the destination host should use the IPv4 protocol is stored; if the IPv6 address priority is higher than the IPv4 address priority, the IP protocol version information representing that the information to be transmitted should use the IPv6 protocol is stored.

When the address priority table 110 is initialized, existing static address selecting methods may be employed.

The present invention further provides a re-encapsulating unit 111 for determining whether or not to re-encapsulate the packaged IP packets by looking up the address priority table 110 according to the address of the destination host.

The receiving unit 120 receives the IP packets transmitted to the host.

The process of the dual stack host will be described below with reference to FIGS. 7-10.

Figure 9:
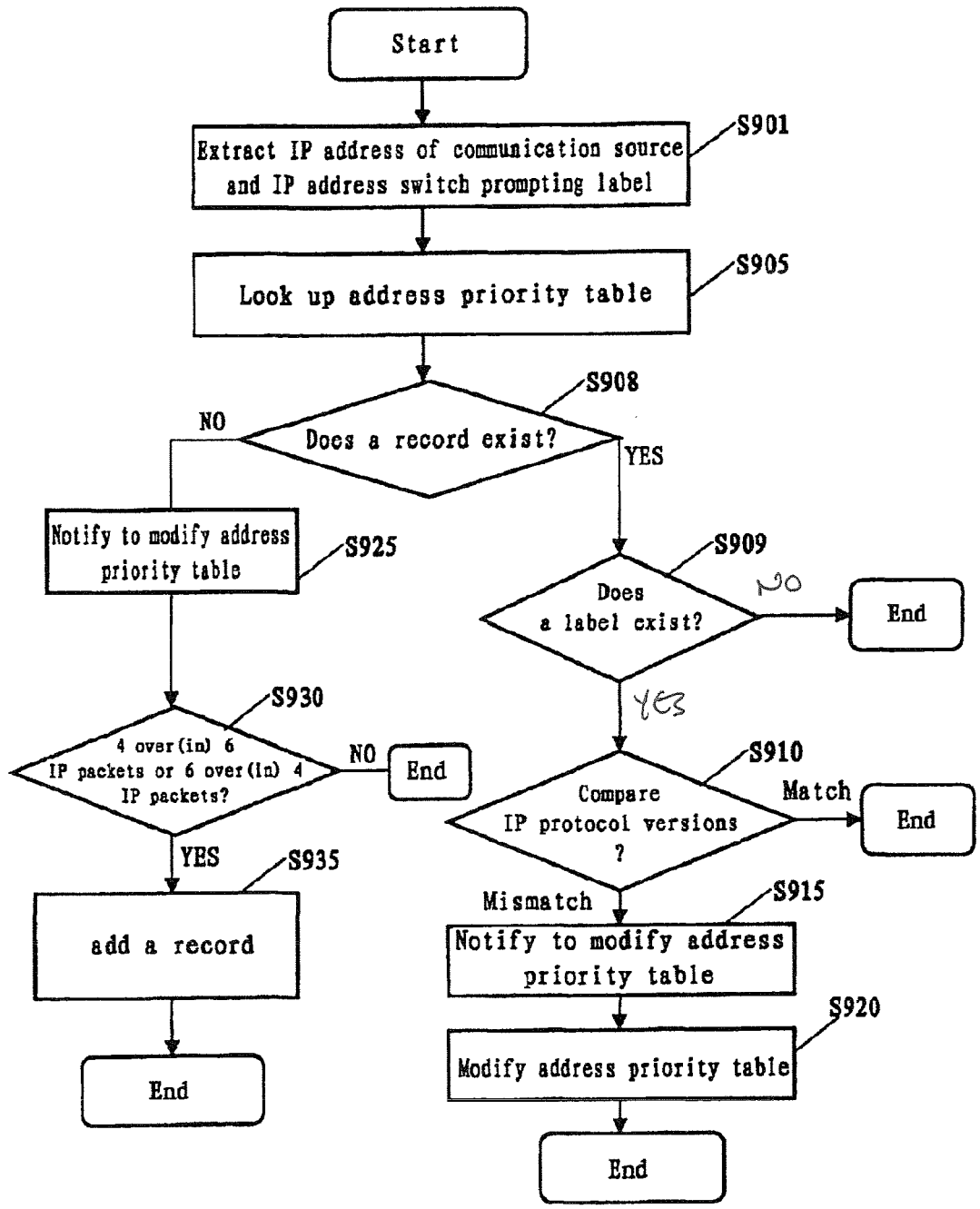
FIG. 9 is a flowchart showing operations performed when the dual stack host receives IP packets.

FIG. 9 shows operations performed when the dual stack host receives IP packets. In step S901, the extracting unit 125 extracts the IP address of the communication source and the IP address switch prompting label from the IP packets received by the receiving unit 120. In step S905, the lookup unit 128 looks up the address priority table 110 with the extracted IP address of the communication source as a keyword. If, in step S908, there is a record whose destination address is the address of the communication source in the address priority table 110, the process proceeds to step S909, where the label detecting unit 121 judges whether or not the IP address switch prompting label is extracted. If no IP address switch prompting label exists, the process ends, otherwise the process proceeds to step S910, where the IP protocol version information stored in the record is compared by the comparing unit 130 with the IP protocol used by the IP address identified by the IP address switch prompting label. If the comparison result shows that they are consistent, the process ends. If the comparison result shows that they are inconsistent, in step S915, the comparing unit 130 notifies the address priority modifying unit 105 to modify the address priority table 110. Then, in step S920, the address priority modifying unit 105 modifies the IP protocol version information stored in the record of the address priority table 110 into the IP protocol version information of the IP protocol used by the IP address identified by the IP address switch prompting label.

In addition, if, in step S908, the lookup unit 128 fails to find in the address priority table 110 a record whose destination address is the address of the communication source, the process proceeds to step S925, where the lookup unit 128 notifies the address priority modifying unit 105 to modify the address priority table 110 and add a record regarding the address of the communication source. Then in step S930, the address priority modifying unit 105 judges whether or not the received packets are 4 over(in) 6 IP packets or 6 over(in) 4 IP packets, based on the extracted IP address of the communication source. This is because if the IP packets are converted in the communication source by means of the tunneling technology, the converted IP packets contain both the IPv4 addresses and the IPv6 addresses of the communication source and the communication destination.

If the judgment result in step S930 is YES, the process proceeds to step S935, where the address priority modifying unit 105 adds a record into the address priority table 110, wherein the IPv4 address of the communication source is added into the field 801 of IPv4 address for the destination host, the IPv6 address of the communication source is added into the field 805 of IPv6 address for the destination host, and the IP protocol version information used by the received IP packets is added into the field 810 of address priority. Otherwise, the process ends.

Through the above process, the address priority table in the dual stack host always holds the IP protocol version information of the IP packets that should be currently used by the latest communication hosts.

Prompting whether to switch the IP addresses by adding a label to the IP packets is described above. However, for the dual stack host, so long as the current network traffic status can be obtained from a router, the IP packets to be transmitted can be switched by the dual stack host in order to be transmitted over the network with lighter traffic, without considering whether or not the network traffic status is obtained by monitoring the label.

For example, when the router detects a serious imbalance of the IPv4 traffic and shortage of the IPv6 traffic, a notifying unit not shown in the router notifies the communication source, which has transmitted the IPv4 packets, of a switch indicating message. In response to the receipt of the message, the communication source modifies the maintained address priority table such that IPv6 is prioritized in the address priority of the corresponding communication destination. In the case where the IPv6 traffic is seriously imbalanced and the IPv4 traffic is insufficient, the process is similar to the above process. Therefore, the address priority table always holds the latest IP protocol version information of the IP packets that should be used when the communication source transmits IP packets to the communication destination.

The operations of the re-encapsulating unit 111 will be described below.

Figure 10:
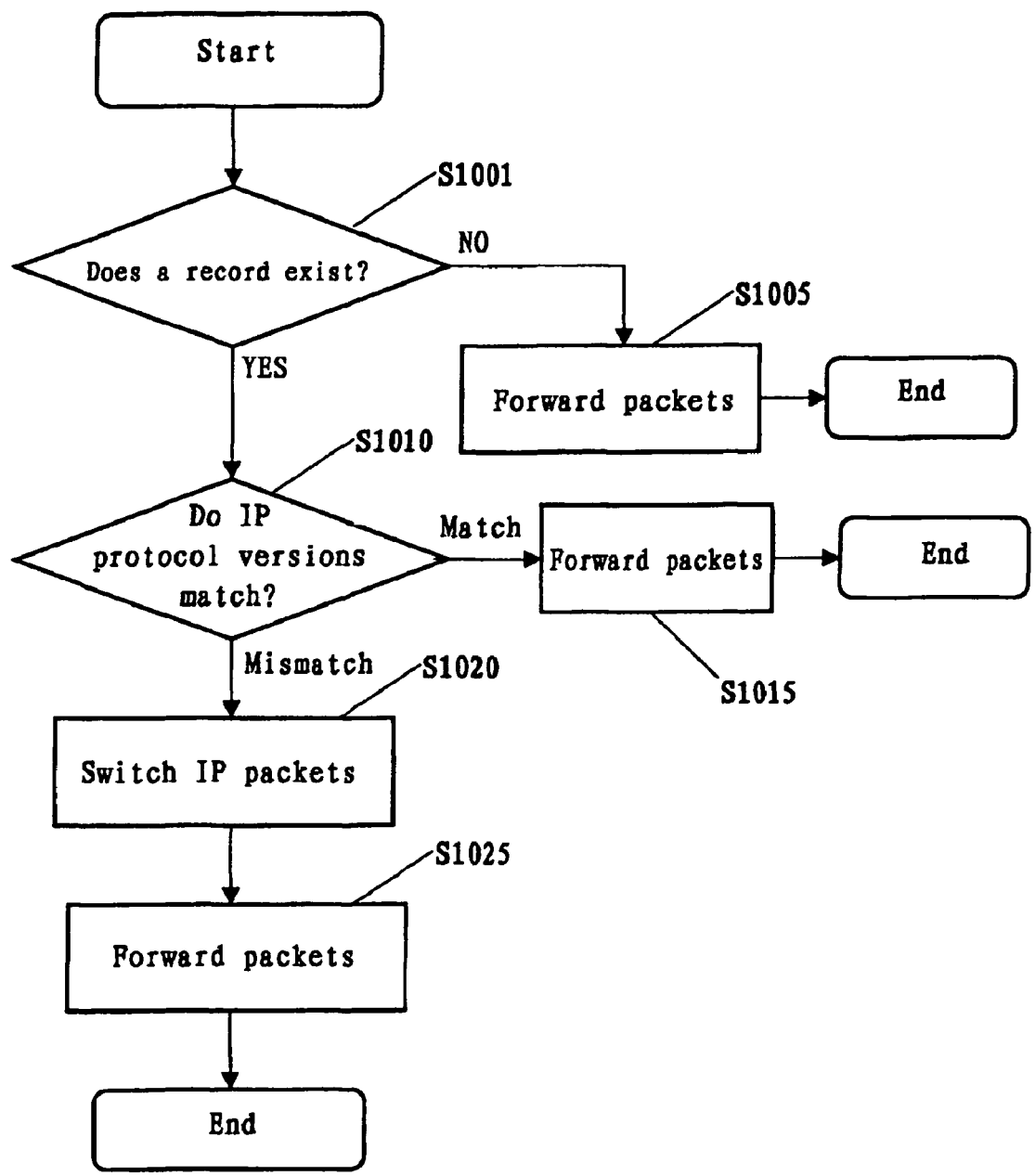
FIG. 10 is a flowchart showing a process of re-encapsulating operations.

FIG. 10 shows a process of re-encapsulating operations.

Firstly, in step S1001, the re-encapsulating unit 111 judges whether or not a record containing the address of the destination host contained in the IP packet to be transmitted exists in the address priority table 110. If there is not such a record, then in step S1005, the re-encapsulating unit 111 forwards the IP packets to be transmitted to the transmitting unit 115 for transmission. Otherwise, if such a record exists, then in step S1010, the re-encapsulating unit 111 judges whether or not the IP protocol version used by the IP packet to be transmitted is consistent with the IP protocol version in the address priority of the record. If so, then in step S1015, the re-encapsulating unit 111 forwards the IP packets to be transmitted to the transmitting unit 115 for transmission. If they are not consistent, then in step S1020, the re-encapsulating unit 111 switches the addresses of the IP packets to be transmitted into the IP addresses of the IP protocol version in the address priority table, creates an IP address switch prompting label based on the IP protocol version information in the address priority table, and inserts the label into the converted IP packets, thereby completing the switching of the IP packets. Then, in step S1025, the re-encapsulating unit 111 forwards the converted IP packet to the transmitting unit for transmission.

Switching from the IPv4 packets to the IPv6 packets by the re-encapsulating unit 111 may be achieved by extending the IPv6 header, and adding all or part of the header information of the IPv4 packets into the extended IPv6 header, i.e., forming 4 over 6 packets.

On the other hand, switching from the IPv6 packets to the IPv4 packets may be achieved by encapsulating the IPv6 packets into the IPv4 packets beginning with the IPv4 address corresponding to its IPv6 address, i.e., forming 6 over 4 packets.

However, the situation where there are many idle spaces unused in the IPv6 packets in the practical application is considered. Therefore, in the present invention, when switching the IPv6 packets into the IPv4 packets, the idle spaces in the IPv6 packets are deleted to form compressed IPv6 packets, and then the compressed IPv6 packets are encapsulated into the IPv4 packets beginning with the IPv4 address corresponding to its IPv6 address to form 6 in 4 packets. In contrast, when switching the IPv4 packets into the IPv6 packets, the idle spaces in the IPv4 packets are deleted to form compressed IPv4 packets, and then the compressed IPv4 packets are encapsulated into IPv6 packets beginning with the IPv6 address corresponding to its IPv4 address to form 4 in 6 packets.

Therefore, according to the present invention, the network traffic may be further reduced.

Taking the router as an example, the process of monitoring the network traffic is described above. However, the present invention is not limited to the router, and may be applied to any network device, such as gateway, which can monitor the network traffic.

It is to be noted that the embodiments described above merely intend to illustrate the present invention and are not limited to the present invention.

The objects of the present invention can be achieved by providing to the system or device directly or indirectly storage media storing program codes of software for implementing the functions of the embodiments, reading out the program codes and performing the same by a computer of the system or device. At this time, so long as the system or device has the function of the program, the manner of implementation is not limited to the program.

Therefore, the program code installed in the computer can implement the present invention since the functions of the present invention can be achieved by a computer. In other words, the claims of the present invention also comprise the computer program for realizing the functions of the present invention.

Herein, so long as the system or device has the function of the program, the program can be executed in the form of, for example, object codes, programs performed by an interpreter, or script data provided to an operating system.

The storage media for providing the program codes comprises, for example, floppy disks, hard disks, optical disks, magneto-optic disks, CD-ROMs, CD-Rs, CD-RWs, magnetic tapes, non-volatile storage cards, ROMs and DVDs (DVD-ROMs and DVD-Rs), etc.

For the method for providing the program, a client computer may connect to a website in the Internet via a browser in the client computer, and the computer program or the compressed files automatically setup by the program of the present invention may be downloaded onto recording media such as hard disks. Further, the program according to the present invention may be provided by segmenting the program codes constituting the program into a plurality of files and downloading the files from different websites. In addition, the claims of the present invention also comprise such an approach that a WWW server downloads a program file for achieving the functions of the present invention to a plurality of users.

Moreover, the program according to the present invention may be encrypted and stored into storage media such as CD-ROMs to be distributed to users, this allowing those users satisfying certain requirements to download encrypted encryption information via the Internet, and allowing the users to decrypt the encrypted program by using the encryption information, such that the program can be installed into the computers of the users.

Except that the functions of the embodiments of the present invention can be achieved by means of the computer executable program, the operating system running on the computer may perform all or part of the actual process to implement the embodiments described above through the process.

Further, after the program codes read out from the recording media are written into a function extended board inserted into the computer and a memory provided in a function extended unit connected to the computer, according to the instruction of the program, a CPU provided in the function extended board and the function extended unit performs all or part of the actual process. The situation where the functions of the above embodiments may be realized by means of the process is also included herein.

The present invention may comprise many variant embodiments within the spirit and scope of the present invention. Therefore, it is to be understood that, the scope of invention is defined by the following claims, and is not limited to the specific embodiments.

Although the embodiments of the present invention has been described in details with reference to the appended drawings, various modifications and changes can be made by those skilled in the art without departing from the spirit and the scope of the present invention. Therefore, the scope of the present invention is only defined by the attached claims.

What is claimed:

1. A network system for traffic balancing among different networks employing a plurality of IP protocols, the network system comprising:

a plurality of hosts supporting the plurality of IP protocols; and a network monitoring device for monitoring traffic in each of the networks;

wherein the network monitoring device comprises a processor, coupled to a memory, for performing operations of:

monitoring the traffic in each of the networks;

judging whether the traffic in a first network employing a first IP protocol is balanced compared with a second network employing a second IP protocol, based on the monitored network traffic; and when it is judged that a traffic imbalance occurs between the first network and the second network, notifying a host transmitting IP packets by employing the first IP protocol to transmit the packets by using the second IP protocol;

wherein a given one of said hosts comprises a processor, coupled to a memory, for performing operations of:

converting the next IP packet to be transmitted employing the first IP protocol into an IP packet employing the second IP protocol, in response to the notification; and transmitting the IP packet employing the second IP protocol; and wherein the first network employing the first IP protocol and the second network employing the second IP protocol comprise alternative routes for transmitting IP packets from a given source to a given destination.

2. The network system of claim 1, wherein the packet employing the first IP protocol is one of an IPv4 packet and an IPv6 packet, and the packet employing the second IP protocol is the other of the IPv4 packet and the IPv6 packet.

3. The network system of claim , wherein the network monitoring device makes the judgment by monitoring bandwidth.

4. The network system of claim 3, wherein the notifying operation in the network monitoring device comprises:

when it is judged that the traffic imbalance occurs in the first network, inserting into the IP packets employing the first IP protocol a label representing the notification of notifying the host to re-encapsulate the IP packets to be transmitted employing the first IP protocol by using the second IP protocol; and forwarding the IP packets employing the first IP protocol with the label inserted to a host as a communication destination;

wherein the memory of the host as the communication destination comprises an address priority table for holding the priority of the IP protocol that should be used when transmitting IP packets to its communication destination;

wherein the processor of the host as the communication destination is further configured for performing operations of:

receiving the IP packets forwarded by the network monitoring device;

detecting the label in the received IP packets; and modifying the address priority table according to the detected label such that the latest priority of the IP protocol that should be used is stored; and wherein the converting operation comprises:
re-encapsulating the IP packets transmitted to the host as the communication destination, with reference to the priority stored in the address priority table; and
inserting the label indicating the used IP protocol into the re-encapsulated IP packets.

5. The network system of claim 4, wherein the re-encapsulating operation comprises switching the IPv4 addresses in the IPv4 packets into the IPv6 addresses or encapsulating the IPv6 packets into the IPv4 packets.

6. The network system of claim 5, wherein the re-encapsulating operation comprises deleting idle segments in the IPv6 packets to form compressed 6 in 4 IP packets while encapsulating the IPv6 packets into the IPv4 packets, and deleting idle segments in the IPv4 packets to form compressed 4 in 6 IP packets while encapsulating the IPv4 packets into the IPv6 packets.

7. A method for traffic balancing among different networks employing two or more IP protocols, the method being used in a network system comprising a plurality of hosts supporting the two or more IP protocols, and a network monitoring device for monitoring traffic in each of the networks, the method comprising:
monitoring the traffic in each of the networks;
judging whether the traffic in a first network employing a first IP protocol is balanced compared with a second network employing a second IP protocol, based on the monitored network traffic;
when it is judged that a traffic imbalance occurs between the first network and the second network, notifying a host transmitting IP packets by employing the first IP protocol to re-encapsulate the packets to be transmitted by using the second IP protocol; and
in response to the notification, the host converting the next IP packet to be transmitted employing the first IP protocol into IP packet employing the second IP protocol and then transmitting the same;
wherein the first network employing the first IP protocol and the second network employing the second IP protocol comprise alternative routes for transmitting IP packets from a given source to a given destination.

8. The method of claim 7, wherein the packet employing the first IP protocol is one of an IPv4 packet and an IPv6 packet, and the packet employing the second IP protocol is the other of the IPv4 packet and the IPv6 packet.

9. The method of claim 7 wherein a balancing of the network traffic is judged by monitoring bandwidth.

10. The method of claim 8, wherein the IP packets are re-encapsulated by switching the IPv4 addresses in the IPv4 packets to the IPv6 addresses or by encapsulating the IPv6 packets into the IPv4 packets.

11. The method of claim 10, wherein idle segments in the IPv6 packets are deleted to form compressed 6 in 4 IP packets while encapsulating the IPv6 packets into the IPv4 packets, and idle segments in the IPv4 packets are deleted to form compressed 4 in 6 IP packets while encapsulating the IPv4 packets into the IPv6 packets.

12. An IPv4/IPv6 traffic balancing method for balancing information traffic in an IPv4 network and an IPv6 network, the method comprising the steps of:
judging whether a traffic imbalance of IPv4 packets and IPv6 packets transmitted over the networks occurs; and
when the traffic imbalance occurs, converting the IPv4 packets to be subsequently transmitted into the IPv6 packets or the IPv6 packets to be subsequently transmitted into the IPv4 packets, based on the type of the traffic imbalance;
wherein the IPv4 network and the IPv6 network comprise alternative routes for transmitting IP packets from a given source to a given destination.

13. A host used in a network system for traffic balancing among different networks employing two or more IP protocols, the host supporting the two or more IP protocols, and a network monitoring device in the network system monitoring traffic in each of the networks, wherein the host comprises a processor, coupled to a memory, for performing operations of:
when the network monitoring device judges that a traffic imbalance occurs in a network employing a first IP protocol compared with a second network employing a second IP protocol, encapsulating the next IP packet to be transmitted employing the first IP protocol into an IP packet employing the second IP protocol; and
transmitting the IP packet employing the second IP protocol; and
wherein the first network employing the first IP protocol and the second network employing the second IP protocol comprise alternative routes for transmitting IP packets from a given source to a given destination.

14. The host of claim 13, wherein the packet employing the first IP protocol is one of an IPv4 packet and an IPv6 packet, and the packet employing the second IP protocol is the other of the IPv4 packet and the IPv6 packet.

15. The host of claim 14, wherein the encapsulating operation comprises switching the IPv4 addresses in the IPv4 packets into the IPv6 addresses or encapsulating the IPv6 packets into the IPv4 packets.

16. The host of claim 15, wherein the encapsulating operation comprises deleting idle segments of the IPv6 packets to form compressed 6 in 4 IP packets while encapsulating the IPv6 packets into the IPv4 packets, and deleting idle segments of the IPv4 packets to form compressed 4 in 6 IP packets while encapsulating the IPv4 packets into the IPv6 packets.

17. A method performed by a host used in a network system for traffic balancing among different networks employing two or more IP protocols, the host supporting the two or more IP protocols, and a network monitoring device in the network system monitoring traffic in each of the networks, wherein the host performs steps of:
transmitting IP packets employing a first IP protocol;
encapsulating the next IP packet to be transmitted employing the first IP protocol into the IP packet employing a second IP protocol, when the network monitoring device judges that a traffic imbalance occurs in a first network employing the first IP protocol compared with a second network employing the second IP protocol; and
transmitting the IP packet employing the second IP protocol;
wherein the first network employing the first IP protocol and the second network employing the second IP protocol comprise alternative routes for transmitting IP packets from a given source to a given destination.

18. The method of claim 17, wherein the packets employing the first IP protocol are one of an IPv4 packet and an IPv6 packet, and the packets employing the second IP protocol are the other of the IPv4 packet and the IPv6 packet.

19. The method of claim 18, wherein the IP packets are re-encapsulated by switching the IPv4 addresses in the IPv4 packets into the IPv6 addresses or by encapsulating the IPv6 packets into the IPv4 packets.

20. The method of claim 19, wherein idle segments in the IPv6 packets are deleted to form compressed 6 in 4 IP packets while encapsulating the IPv6 packets into the IPv4 packets, and idle segments in the IPv4 packets are deleted to form compressed 4 in 6 IP packets while encapsulating the IPv4 packets into the IPv6 packets.

21. A network monitoring device used in a network system for traffic balancing among different networks employing two or more IP protocols, the network system comprising a plurality of hosts supporting the two or more IP protocols, wherein the network monitoring device comprises a processor, coupled to a memory, for performing operations of:
monitoring traffic in each of the networks;
judging whether the traffic in a first network employing a first IP protocol is balanced compared with a second network employing a second IP protocol, based on the monitored network traffic; and
when it is judged that a traffic imbalance occurs in the first network, notifying a host transmitting IP packets by employing the first IP protocol to re-encapsulate the packets to be transmitted by using the second IP protocol;
wherein the first network employing the first LP protocol and the second network employing the second IP protocol comprise alternative routes for transmitting IP packets from a given source to a given destination.

22. The network monitoring device of claim 21, wherein the packet employing the first IP protocol is one of an IPv4 packet and an IPv6 packet, and the packet employing the second IP protocol is the other of the IPv4 packet and the IPv6 packet.

23. The network monitoring device of claim 21, wherein the network monitoring device makes the judgment by monitoring bandwidth.

24. The network monitoring device of claim 23, wherein the notifying operation comprises:
when it is judged that traffic imbalance occurs in the first network, inserting into the IP packets employing the first IP protocol, a label representing the notification of notifying the host to re-encapsulate the IP packets employing the first IP protocol to be transmitted by using the second protocol; and
forwarding the IP packets employing the first IP protocol with the label inserted to a host as a communication destination.

25. The network monitoring device of claim 24, wherein the network monitoring device is a router or a gateway.

26. A method performed by a network monitoring device used in a network system for traffic balancing among different networks employing two or more IP protocols, the network system comprising a plurality of hosts supporting the two or more IP protocols, the method comprising steps of:
monitoring traffic in each of the networks;
judging whether the traffic in a first network employing a first IP protocol is balanced compared with a second network employing a second IP protocol, based on the monitored network traffic; and
when it is judged that a traffic imbalance occurs in the first network, notifying a host transmitting IP packets by employing the first IP protocol to re-encapsulate the packets to be transmitted by using the second IP protocol;
wherein the first network employing the first IP protocol and the second network employing the second IP protocol comprise alternative routes for transmitting IP packets from a given source to a given destination.

27. The method of claim 26, wherein the packet employing the first IP protocol is one of an IPv4 packet and IPv6 packet, and the packet employing the second IP protocol is the other of the IPv6 packet and the IPv6 packet.

28. The method of claim 26, wherein the judgment is made by monitoring bandwidth.

29. The method of claim 28, further comprising steps of, when it is judged that a traffic imbalance occurs in the first network:
inserting a label representing the notification of notifying the host to re-encapsulate the IP packets employing the first IP protocol to be transmitted by using the second protocol into the IP packets employing the first IP protocol; and
forwarding the IP packets employing the first IP protocol with the label inserted to a host as a communication destination.

30. A non-transitor computer readable storage medium having recorded thereon a program product for implementing the method of claim 26.

31. A non-transitory computer readable storage medium having recorded thereon a program product for implementing the method of claim 17.

\* \* \* \* \*